(12) United States Patent
Kuraoka

(10) Patent No.: US 11,889,047 B2
(45) Date of Patent: Jan. 30, 2024

(54) IMAGE PROCESSING DEVICE AND IMAGE PROCESSING METHOD

(71) Applicant: SUBARU CORPORATION, Tokyo (JP)

(72) Inventor: Minoru Kuraoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 322 days.

(21) Appl. No.: 17/220,095

(22) Filed: Apr. 1, 2021

(65) Prior Publication Data
US 2021/0312159 A1    Oct. 7, 2021

(30) Foreign Application Priority Data
Apr. 3, 2020   (JP) .................. 2020-067353

(51) Int. Cl.
*G06T 7/593* (2017.01)
*H04N 13/239* (2018.01)
*G06V 20/64* (2022.01)
*G06V 20/56* (2022.01)
*G06V 10/25* (2022.01)
*G06V 10/75* (2022.01)

(52) U.S. Cl.
CPC ........... *H04N 13/239* (2018.05); *G06T 7/593* (2017.01); *G06V 10/25* (2022.01); *G06V 10/751* (2022.01); *G06V 20/56* (2022.01); *G06V 20/64* (2022.01); *G06T 2207/10012* (2013.01); *G06T 2207/30252* (2013.01); *G06V 2201/08* (2022.01)

(58) Field of Classification Search
CPC .............. H04N 13/239; H04N 13/271; H04N 2013/0081; H04N 2013/0092; G06T 7/593; G06T 2207/10012; G06T 2207/30252; G06V 10/25; G06V 10/751; G06V 20/56; G06V 20/64; G06V 2201/08
See application file for complete search history.

(56) References Cited

U.S. PATENT DOCUMENTS

| | | | |
|---|---|---|---|
| 2016/0019429 A1* | 1/2016 | Ishigaki | G06F 16/583 348/47 |
| 2017/0024875 A1 | 1/2017 | Ishigami et al. | |
| 2018/0144499 A1* | 5/2018 | Watanabe | G06T 7/74 |

FOREIGN PATENT DOCUMENTS

JP    2017-27279 A    2/2017

* cited by examiner

*Primary Examiner* — John Villecco
*Assistant Examiner* — Han Hoang
(74) *Attorney, Agent, or Firm* — TROUTMAN PEPPER HAMILTON SANDERS LLP

(57) ABSTRACT

An image processing device includes a detector, a setting unit, a calculator, an estimator, and a determining unit. The detector sets a three-dimensional object region by detecting a three-dimensional object. The setting unit sets a first image region corresponding to the three-dimensional object region, a second image region including a left end of and partly overlapping the first image region, and a third image region including a right end of and partly overlapping the first image region. The calculator calculates representative values of parallax-related values in pixel columns in the image regions, and calculates an approximate line of the representative values in each of the image regions. The estimator estimates a continuous structure degree, from a slope value of the approximate line of each of the image regions. The determining unit determines whether the three-dimensional object is a vehicle, from the continuous structure degree.

19 Claims, 10 Drawing Sheets

IMAGE PROCESSING DEVICE AND IMAGE PROCESSING METHOD

CROSS-REFERENCE TO RELATED APPLICATION

The present application claims priority from Japanese Patent Application No. 2020-067353 filed on Apr. 3, 2020, the entire contents of which are hereby incorporated by reference.

BACKGROUND

The technology relates to an image processing device that analyzes an imaged three-dimensional object, and to an image processing method to be used in such an image processing device.

Image processing devices to be mounted on a vehicle, such as an automobile, include an image processing device that generates a distance image on the basis of a stereo image obtained by a stereo camera, and detects a three-dimensional object on the basis of distance continuity in the distance image (e.g., Japanese Unexamined Patent Application Publication No. 2017-27279).

SUMMARY

An aspect of the technology provides an image processing device including a detector, a setting unit, a calculator, an estimator, and a determining unit. The detector is configured to set a three-dimensional object region by detecting a three-dimensional object, on the basis of a distance image that is to be generated on the basis of a stereo image and includes parallax-related values corresponding to parallaxes in respective pixels. The setting unit is configured to set a first image region corresponding to the three-dimensional object region, a second image region including a left end of the first image region and partly overlapping the first image region, and a third image region including a right end of the first image region and partly overlapping the first image region. The calculator is configured to calculate representative values of the parallax-related values in pixel columns in the first image region, the second image region, and the third image region, and to calculate, in each of the first image region, the second image region, and the third image region, an approximate line of the representative values in the respective pixel columns. The estimator is configured to estimate a continuous structure degree indicating a degree of likeliness of the three-dimensional object being a continuous structure, on the basis of a first slope value of the approximate line of the first image region, a second slope value of the approximate line of the second image region, and a third slope value of the approximate line of the third image region. The determining unit is configured to determine whether the three-dimensional object detected by the detector is a vehicle, on the basis of the continuous structure degree.

An aspect of the technology provides an image processing method including: setting a three-dimensional object region by detecting a three-dimensional object, on the basis of a distance image that is to be generated on the basis of a stereo image and includes parallax-related values corresponding to parallaxes in respective pixels; setting a first image region corresponding to the three-dimensional object region, a second image region including a left end of the first image region and partly overlapping the first image region, and a third image region including a right end of the first image region and partly overlapping the first image region; calculating representative values of the parallax-related values in pixel columns in the first image region, the second image region, and the third image region; calculating, in each of the first image region, the second image region, and the third image region, an approximate line of the representative values in the respective pixel columns; estimating a continuous structure degree indicating a degree of likeliness of the three-dimensional object being a continuous structure, on the basis of a first slope value of the approximate line of the first image region, a second slope value of the approximate line of the second image region, and a third slope value of the approximate line of the third image region; and determining whether the three-dimensional object detected is a vehicle, on the basis of the continuous structure degree.

An aspect of the technology provides an image processing device including circuitry. The circuitry is configured to set a three-dimensional object region by detecting a three-dimensional object, on the basis of a distance image that is to be generated on the basis of a stereo image and includes parallax-related values corresponding to parallaxes in respective pixels. The circuitry is further configured to set a first image region corresponding to the three-dimensional object region, a second image region including a left end of the first image region and partly overlapping the first image region, and a third image region including a right end of the first image region and partly overlapping the first image region. The circuitry is further configured to calculate representative values of the parallax-related values in pixel columns in the first image region, the second image region, and the third image region. The circuitry is further configured to calculate, in each of the first image region, the second image region, and the third image region, an approximate line of the representative values in the respective pixel columns. The circuitry is further configured to estimate a continuous structure degree indicating a degree of likeliness of the three-dimensional object being a continuous structure, on the basis of a first slope value of the approximate line of the first image region, a second slope value of the approximate line of the second image region, and a third slope value of the approximate line of the third image region. The circuitry is further configured to determine whether the three-dimensional object detected by the detector is a vehicle, on the basis of the continuous structure degree.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
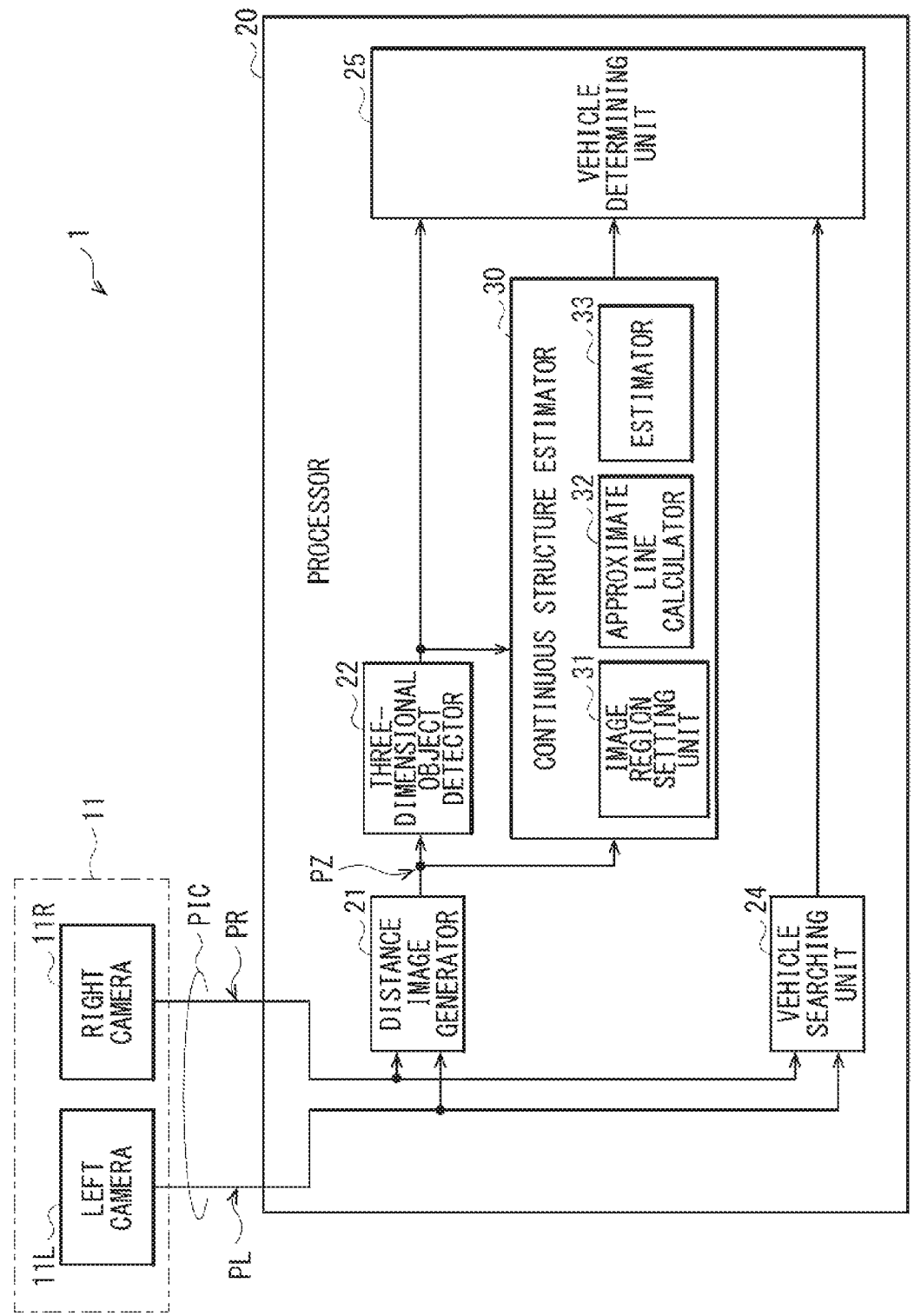
FIG. 1 is a block diagram illustrating a configuration example of an image processing device according to one example embodiment of the technology.

It is desired that an image processing device to be mounted on a vehicle be able to accurately determine whether a detected three-dimensional object is a vehicle, and a further improvement in determination accuracy is expected.

It is desirable to provide an image processing device and an image processing method that make it possible to enhance accuracy in determining whether a three-dimensional object is a vehicle.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

FIG. 1 illustrates a configuration example of an image processing device, e.g., an image processing device 1, according to an example embodiment. The image processing device 1 may include a stereo camera 11 and a processor 20. The image processing device 1 may be mounted on a vehicle 10 such as an automobile.

The stereo camera 11 may be configured to capture an image frontward of the vehicle 10, to generate a pair of images having parallax with respect to each other, e.g., a left image PL and a right image PR. The stereo camera 11 may include a left camera 11L and a right camera 11R. The left camera 11L and the right camera 11R may each include a lens and an image sensor. In this example, the left camera 11L and the right camera 11R may be disposed near an upper part of a front windshield of the vehicle 10, in vehicle interior of the vehicle 10. The left camera 11L and the right camera 11R may be spaced apart at a predetermined distance in a widthwise direction of the vehicle 10. The left camera 11L and the right camera 11R may perform imaging operation in synchronization with each other. The left camera 11L may generate the left image PL, and the right camera 11R may generate the right image PR. The left image PL and the right image PR may constitute a stereo image PIC. The stereo camera 11 may perform the imaging operation at a predetermined frame rate, e.g., 60 [fps], to generate a sequence of the stereo images PIC.

Figure 2:
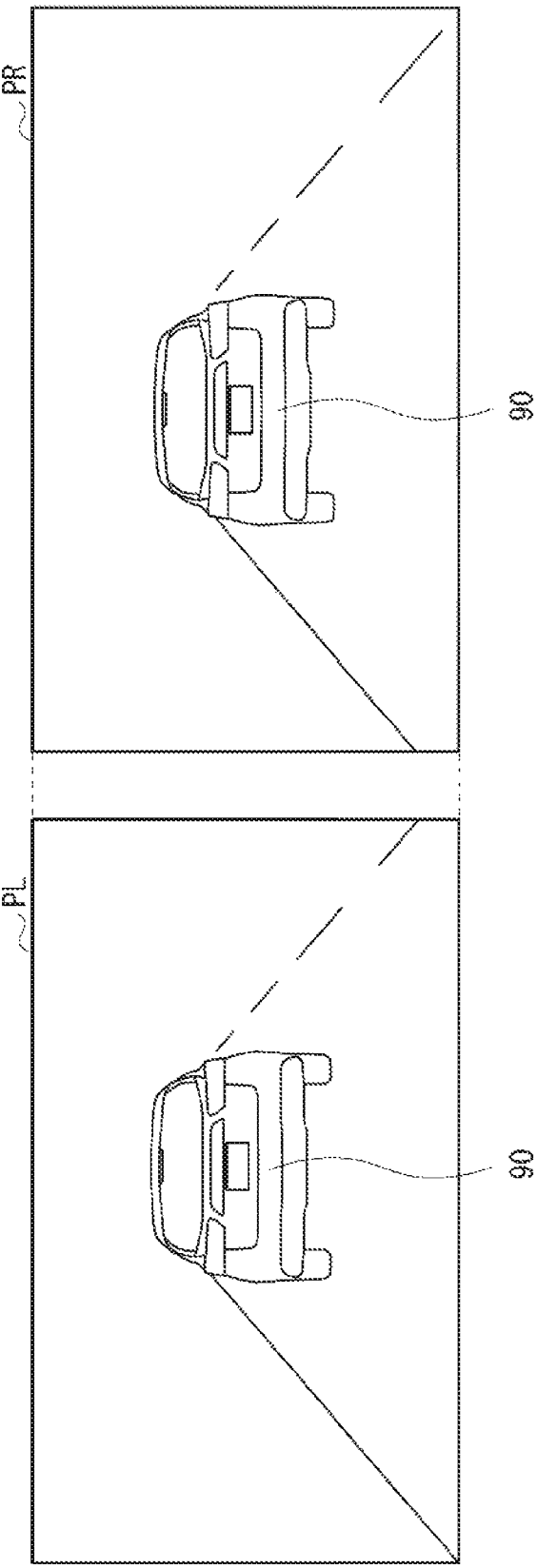
FIGS. 2a and 2B are explanatory diagrams illustrating an example of a stereo image illustrated in FIG. 1.

FIGS. 2a and 2b illustrate an example of the stereo image PIC. FIG. 2a illustrates an example of the left image PL, and FIG. 2b illustrates an example of the right image PR. In this example, a preceding vehicle 90 is traveling ahead of the vehicle 10 on a road traveled by the vehicle 10 (hereinafter also referred to as a "travel road"). The left camera 11L may capture an image of the preceding vehicle 90 to generate the left image PL. The right camera 11R may capture an image of the preceding vehicle 90 to generate the right image PR. The stereo camera 11 may generate the stereo image PIC including the left image PL and the right image PR as described.

The processor 20 illustrated in FIG. 1 may be configured to recognize a vehicle ahead of the vehicle 10, on the basis of the stereo image PIC supplied from the stereo camera 11. In the vehicle 10, on the basis of, for example, information regarding a three-dimensional object recognized by the processor 20, for example, a travel control of the vehicle 10 may be made, or alternatively, information regarding the vehicle recognized may be displayed on a console monitor. Examples of the travel control may include automatic emergency braking (AEB) and adaptive cruise control (ACC). The processor 20 may include, for example, a central processing unit (CPU), a random access memory (RAM), and a read only memory (ROM). The CPU may execute programs. The RAM may temporarily hold processed data. The ROM may hold the programs. The processor 20 may include a distance image generator 21, a three-dimensional object detector 22, a continuous structure estimator 30, a vehicle searching unit 24, and a vehicle determining unit 25.

The distance image generator 21 may be configured to perform predetermined image processing on the basis of the left image PL and the right image PR included in the stereo image PIC, to generate a distance image PZ. Examples of the predetermined image processing may include a stereo matching process and a filtering process. The distance image generator 21 may perform the stereo matching process by identifying a corresponding point including two image points that correspond to each other, on the basis of the left image PL and the right image PR. A pixel value of each pixel in the distance image PZ may be a parallax value. The parallax value may be, for example, a difference between a horizontal coordinate value of the image point in the left image PL and a horizontal coordinate value of the image point in the right image PR. The parallax value may correspond to a distance value, in three-dimensional real space, to a point corresponding to each pixel. The distance image generator 21 may supply the generated distance image PZ to the three-dimensional object detector 22 and the continuous structure estimator 30.

The three-dimensional object detector 22 is configured to detect a three-dimensional object on the basis of the distance image PZ. The three-dimensional object detector 22 sets a three-dimensional object region Robj in an image region corresponding to the detected three-dimensional object in the distance image PZ.

Figure 3:
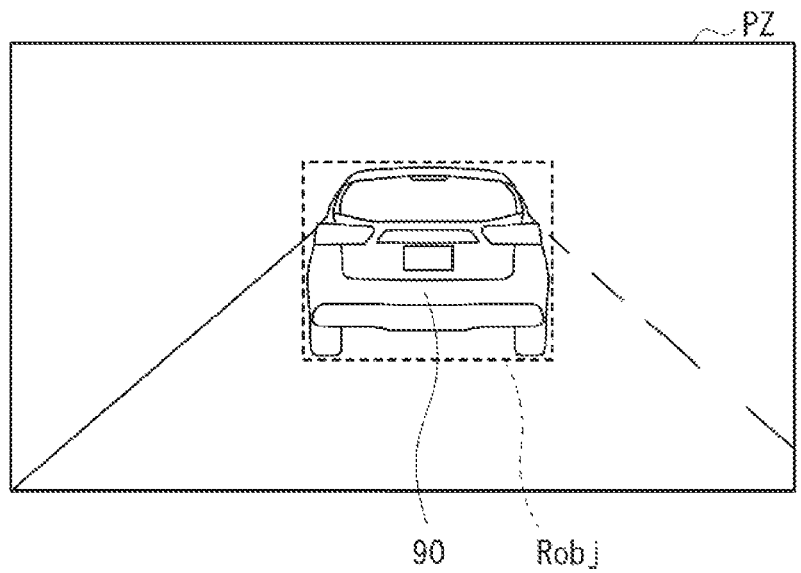
FIG. 3 is an explanatory diagram illustrating an operation example of a three-dimensional object detector illustrated in FIG. 1.

FIG. 3 illustrates an example of the three-dimensional object region Robj, in the distance image PZ, detected by the three-dimensional object detector 22. Although the distance image PZ is assumed to be an image constituted by parallax values, FIG. 3 illustrates a three-dimensional object itself for convenience of description. The distance image PZ may have consecutive parallax values in a region corresponding to a three-dimensional object, such as the preceding vehicle 90, a guardrail, a wall, a building, or a person. The three-dimensional object detector 22 may use such consecutive parallax values included in the distance image PZ to detect a three-dimensional object. The three-dimensional object detector 22 may set the three-dimensional object region Robj in a region corresponding to the detected three-dimensional object in the distance image PZ. In a case where the image region having consecutive parallax values is wide, as with a guardrail or a wall, for example, the three-dimensional object detector 22 may set the three-dimensional object region Robj within a range of a predetermined size or less. The three-dimensional object detector 22 may supply information regarding the set three-dimensional object region Robj to the continuous structure estimator 30 and the vehicle determining unit 25.

The continuous structure estimator 30 may be configured to estimate, on the basis of the distance image PZ, a degree of likeliness of the three-dimensional object detected by the three-dimensional object detector 22 being a continuous structure. A continuous structure may be a structure extending over a relatively long distance along the travel road, such as a guardrail or a wall. The continuous structure estimator 30 may estimate the degree of likeliness of the three-dimensional object being such a continuous structure (continuous structure degree D). The continuous structure estimator 30 may supply information regarding the continuous structure degree D to the vehicle determining unit 25. The continuous structure estimator 30 may include an image region setting unit 31, an approximate line calculator 32, and an estimator 33.

The image region setting unit 31 is configured to set three image regions R (image regions R1 to R3) in the distance image PZ, on the basis of the three-dimensional object region Robj set by the three-dimensional object detector 22. In one example, the image region setting unit 31 may set the image region R1 at a position corresponding to the three-dimensional object region Robj, set the image region R2 at a position shifted to the left from the image region R1, and set the image region R3 at a position shifted to the right from the image region R2.

The approximate line calculator 32 is configured to calculate a representative value of parallax values (representative parallax value), in each of pixel columns in the three image regions R set by the image region setting unit 31. The approximate line calculator 32 is further configured to calculate, in each of the three image regions R, an approximate line L of the representative parallax values in the respective pixel columns.

The estimator 33 is configured to estimate, on the basis of a slope value A of the approximate line L in each of the three image regions R, the degree of likeliness of the three-dimensional object detected by the three-dimensional object detector 22 being a continuous structure (the continuous structure degree D). The continuous structure degree D may exhibit a higher value as the three-dimensional object is more likely to be a continuous structure.

The vehicle searching unit 24 may be configured to search for a vehicle with the use of techniques of machine learning, on the basis of an image P that is one of the left image PL and the right image PR.

Figure 4:
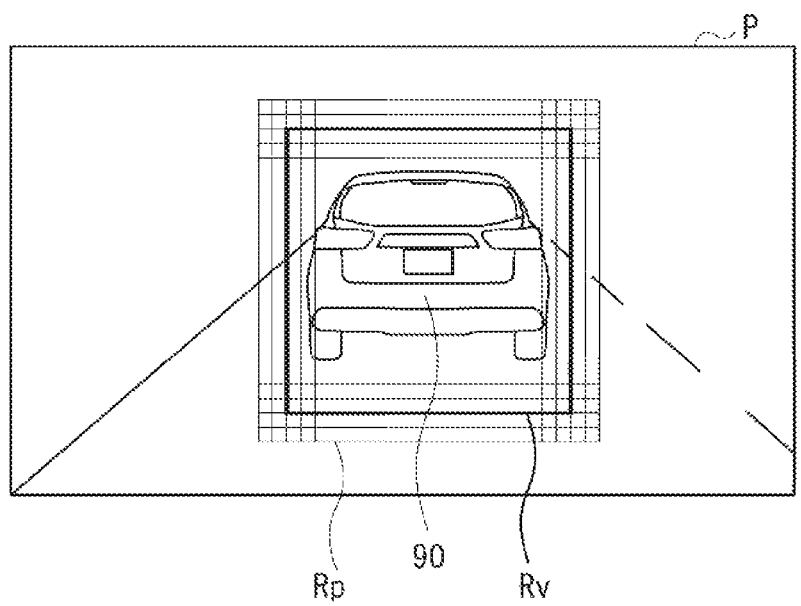
FIG. 4 is an explanatory diagram illustrating an operation example of a vehicle searching unit illustrated in FIG. 1.

FIG. 4 schematically illustrates an operation example of the vehicle searching unit 24. The image P may include an image of the preceding vehicle 90 traveling ahead of the vehicle 10. The vehicle searching unit 24 may sequentially set a plurality of rectangular processing target regions Rp in the image P, while gradually changing positions and sizes, for example. The vehicle searching unit 24 may calculate a vehicle score SC in each of the processing target regions Rp, with the use of the techniques of machine learning. The vehicle score SC may exhibit a higher value as an image of the processing target region Rp is more likely to include a vehicle feature. For example, the vehicle searching unit 24 may set, as a vehicle region Rv, the processing target region Rp having the highest vehicle score SC of the plurality of processing target regions Rp in a case where the relevant vehicle score SC is a predetermined score or more. The vehicle searching unit 24 may supply information regarding the vehicle region Rv, and the vehicle score SC to the vehicle determining unit 25.

The vehicle determining unit 25 is configured to determine whether the three-dimensional object is a vehicle, on the basis of a detection result obtained by the three-dimensional object detector 22, the continuous structure degree D obtained by the continuous structure estimator 30, and a search result obtained by the vehicle searching unit 24.

In one embodiment, the three-dimensional object detector 22 may serve as a "detector". In one embodiment, the image region setting unit 31 may serve as a "setting unit". In one embodiment, the approximate line calculator 32 may serve as a "calculator". In one embodiment, the estimator 33 may serve as an "estimator". In one embodiment, the vehicle determining unit 25 may serve as a "determining unit". In one embodiment, the distance image PZ may serve as a "distance image". In one embodiment, the parallax values in the distance image PZ may serve as "parallax-related values". In one embodiment, the three-dimensional object region Robj may serve as a "three-dimensional object region". In one embodiment, the image region R1 may serve as a "first image region". In one embodiment, the image region R2 may serve as a "second image region". In one embodiment, the image region R3 may serve as a "third image region". In one embodiment, approximate line L may serve as an "approximate line". In one embodiment, the continuous structure degree D may serve as a "continuous structure degree".

Description now moves on to operation and workings of the image processing device 1 according to the example embodiment.

First, summary of overall operation of the image processing device 1 is described with reference to FIG. 1. The stereo camera 11 may capture an image frontward of the vehicle 10, to generate the stereo image PIC including the left image PL and the right image PR having parallax with respect to each other. The distance image generator 21 may generate the distance image PZ, on the basis of the left image PL and the right image PR included in the stereo image PIC. The three-dimensional object detector 22 detects a three-dimensional object on the basis of the distance image PZ. The continuous structure estimator 30 may estimate, on the basis of the distance image PZ, the degree of likeliness of the three-dimensional object detected by the three-dimensional object detector 22 being a continuous structure (the continuous structure degree D). The vehicle searching unit 24 may search for a vehicle with the use of the techniques of machine learning, on the basis of the image P that is one of the left image PL and the right image PR. The vehicle determining unit 25 may determine whether the three-dimensional object is a vehicle, on the basis of the detection result obtained by the three-dimensional object detector 22, the continuous structure degree D obtained by the continuous structure estimator 30, and the search result obtained by the vehicle searching unit 24.

In searching for a vehicle, the vehicle searching unit 24 may sequentially set the plurality of processing target regions Rp in the image P, and calculate the vehicle score SC with the use of the techniques of machine learning, by checking whether the image in each of the processing target regions Rp includes a vehicle feature. In the calculation, in a case where the image in the processing target region Rp is not an image of a vehicle but its image pattern has a vehicle feature, the vehicle score SC can exhibit a high value. For example, in a case where the image of the processing target region Rp is an image of a continuous structure, such as a guardrail or a wall, the image pattern can have a vehicle feature, and the vehicle score SC can exhibit a high value in such a case.

Figure 5:
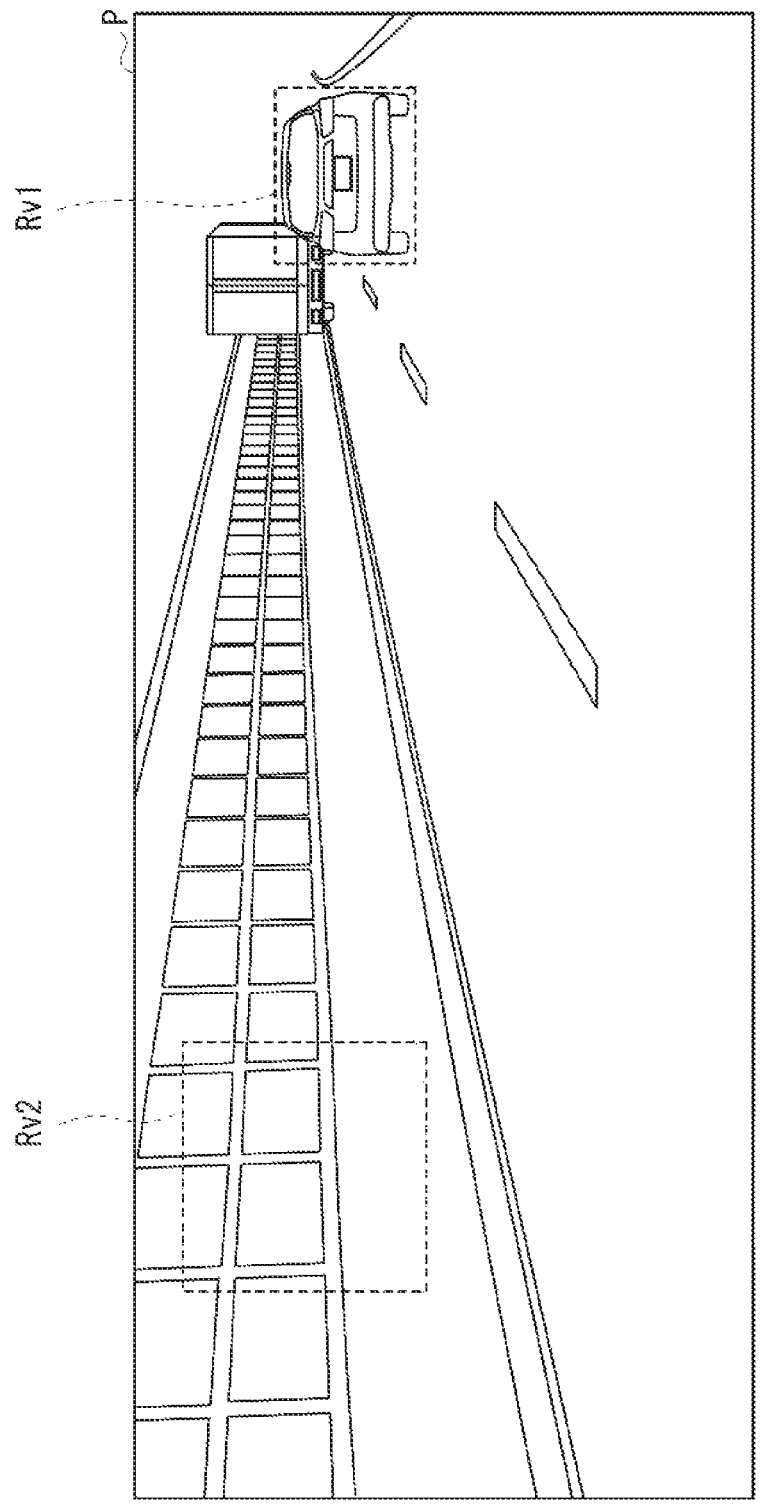
FIG. 5 is another explanatory diagram illustrating the operation example of the vehicle searching unit illustrated in FIG. 1.

FIG. 5 illustrates an operation example of the vehicle searching unit 24. In the image P, vehicle regions Rv1 and Rv2 may be set in two regions where the vehicle score SC exhibits high values. The vehicle region Rv1 may be set for a vehicle preceding the vehicle 10. The vehicle region Rv2 may be set for part of a wall of the travel road. In other words, the vehicle searching unit 24 may determine that the image pattern of the part of the wall of the travel road has a vehicle feature, calculate a high value as the vehicle score SC, and set the vehicle region Rv2 in the part of the wall.

In a case where a continuous structure is erroneously determined as being a vehicle as described above, for example, a malfunction can occur in the travel control of the vehicle 10, such as AEB or ACC. Hence, in the image processing device 1, the continuous structure estimator 30 may calculate the continuous structure degree D of a three-dimensional object, and the vehicle determining unit 25 may determine whether the three-dimensional object is a vehicle, on the basis of the detection result obtained by the three-dimensional object detector 22, the continuous structure degree D obtained by the continuous structure estimator 30, and the search result obtained by the vehicle searching unit 24. This enables the vehicle determining unit 25 to, in a case where the continuous structure degree D of the three-dimensional object is high, make the relevant three-dimensional object less likely to be determined as being a vehicle. In one example, the vehicle determining unit 25 may make the relevant three-dimensional object less likely to be determined as being a vehicle, for example, by correcting the vehicle score SC obtained by the vehicle searching unit 24 to a lower score, or by changing a threshold to be used in performing vehicle determination on the basis of the vehicle score SC to a higher value. In this way, the image processing device 1 makes it possible to enhance accuracy in determining whether a three-dimensional object is a vehicle.

Described next are details of operation of the continuous structure estimator 30.

Figure 6:
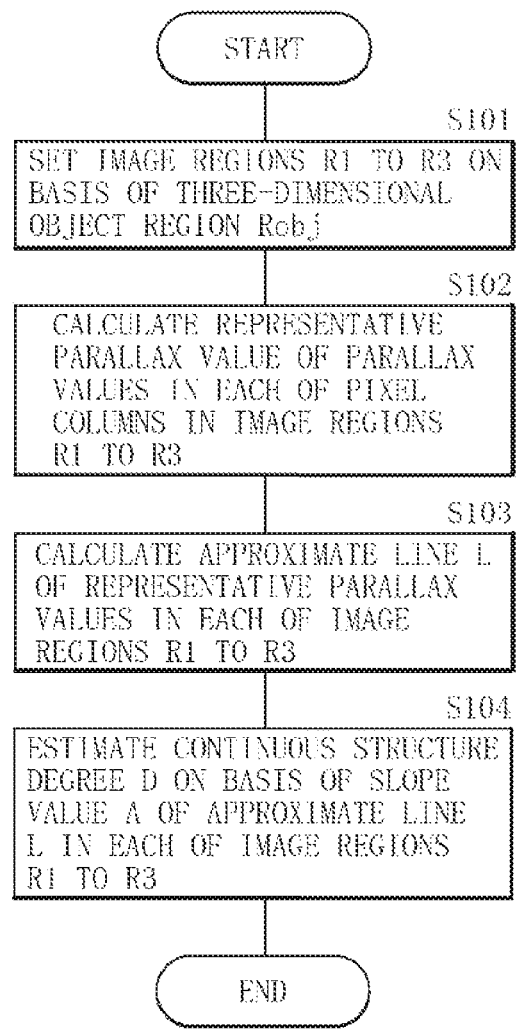
FIG. 6 is a flowchart illustrating an operation example of a continuous structure estimator illustrated in FIG. 1.

FIG. 6 illustrates an operation example of the continuous structure estimator 30. The continuous structure estimator 30 may set the image regions R1 to R3 on the basis of the three-dimensional object region Robj set by the three-dimensional object detector 22, calculate the approximate line L of the representative parallax values in each of the image regions R1 to R3, and estimate the continuous structure degree D of the three-dimensional object on the basis of the slope value A of the approximate line L of each of the image regions R1 to R3. This process is described in detail below.

First, the image region setting unit 31 may set the image regions R1 to R3 in the distance image PZ, on the basis of the three-dimensional object region Robj set by the three-dimensional object detector 22 (step S101).

Figure 7:
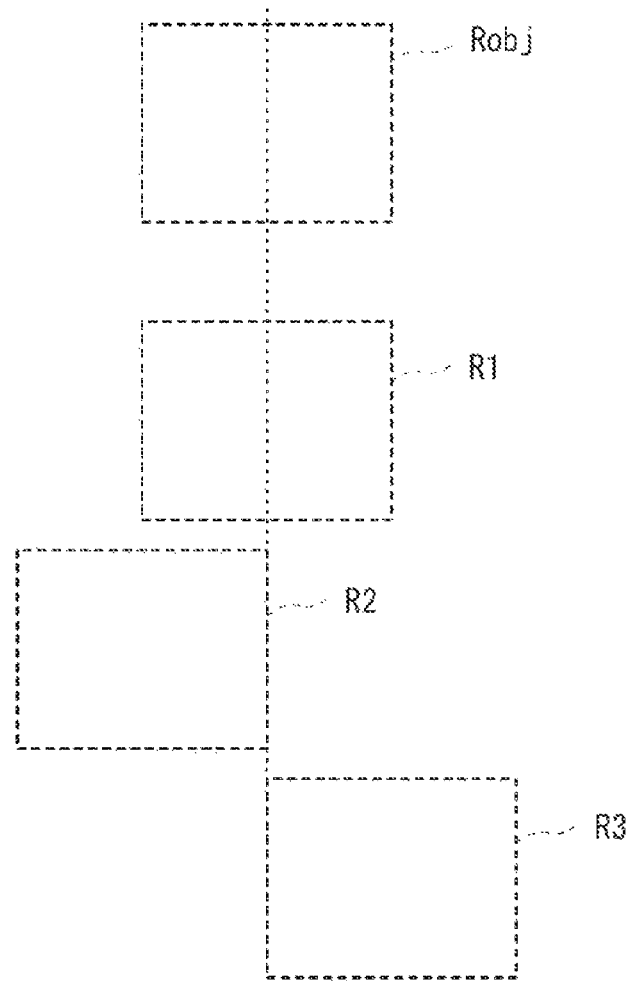
FIG. 7 is an explanatory diagram illustrating an operation example of an image region setting unit illustrated in FIG. 1.

FIG. 7 illustrates an operation example of the image region setting unit 31. FIG. 7 illustrates positions of horizontal coordinates, in the distance image PZ, of the three-dimensional object region Robj and the image regions R1 to R3.

The image region setting unit 31 may set the image region R1 at the position corresponding to the three-dimensional object region Robj. In this example, the image region R1 may have the same size as a size of the three-dimensional object region Robj. In terms of horizontal coordinates of the distance image PZ, the position of the image region R1 may be the same as a position of the three-dimensional object region Robj. In terms of vertical coordinates of the distance image PZ, the position of the image region R1 may be the same as the position of the three-dimensional object region Robj.

The image region setting unit 31 may set the image region R2 at the position shifted to the left from the image region R1, and set the image region R3 at the position shifted to the right from the image region R2. In one example, the image region setting unit 31 may set the image region R2 to make it include a left end of the image region R1 and partly overlap the image region R1, and may set the image region R3 to make it include a right end of the image region R1 and partly overlap the image region R1. In this example, the image regions R2 and R3 may each have the same size as the size of the image region R1. In terms of the horizontal coordinates of the distance image PZ, the position of the image region R2 may be a position shifted to the left from the position of the image region R1 by half of a width of the image region R1. In terms of the horizontal coordinates of the distance image PZ, the position of the image region R3 may be a position shifted to the right from the position of the image region R1 by half of the width of the image region R1. In terms of the vertical coordinates of the distance image PZ, the positions of the image regions R2 and R3 may be the same as the position of the image region R1.

Thereafter, the approximate line calculator 32 may calculate the representative value of the parallax values (the representative parallax value), in each of the pixel columns in the three image regions R1 to R3 set by the image region setting unit 31 (step S102).

Figure 8:
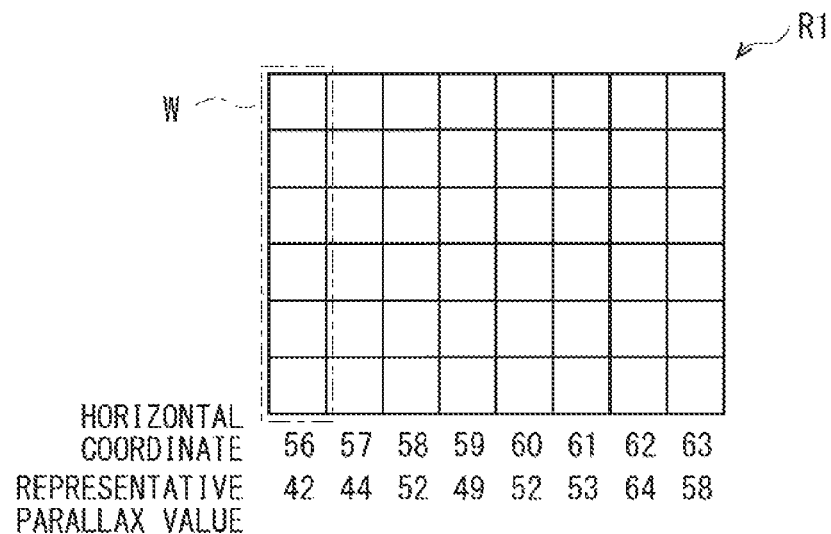
FIG. 8 is an explanatory diagram illustrating an operation example of an approximate line calculator illustrated in FIG. 1.

FIG. 8 illustrates an example of the representative parallax values in the image region R1. In this example, the width of the image region R1 in terms of the horizontal coordinates is assumed to be "8", for convenience of description. Without being limited thereto, for example, the width may be "7" or less, or may be "9" or more.

The approximate line calculator 32 may, in each of a plurality of pixel columns W, use a histogram of parallax values in the pixel column W to calculate a most frequent value of the parallax values as the representative parallax value. For example, in a case where the most frequent value is not obtainable for a reason such as the number of parallax values in the pixel column W being small, the approximate line calculator 32 may calculate an average of the parallax values as the representative parallax value. In this example, as illustrated in FIG. 8, the approximate line calculator 32 may obtain a representative parallax value "42" on the basis of the parallax values in the pixel column W whose horizontal coordinate is "56". The same may apply to other pixel columns W.

In this way, the approximate line calculator 32 may calculate the representative parallax values in the image region R1. Similarly, the approximate line calculator 32 may calculate the representative parallax values in the image region R2, and calculate the representative parallax values in the image region R3.

Thereafter, the approximate line calculator 32 may calculate the approximate line L of the representative parallax values in each of the image regions R1 to R3 (step S103).

Figure 9:
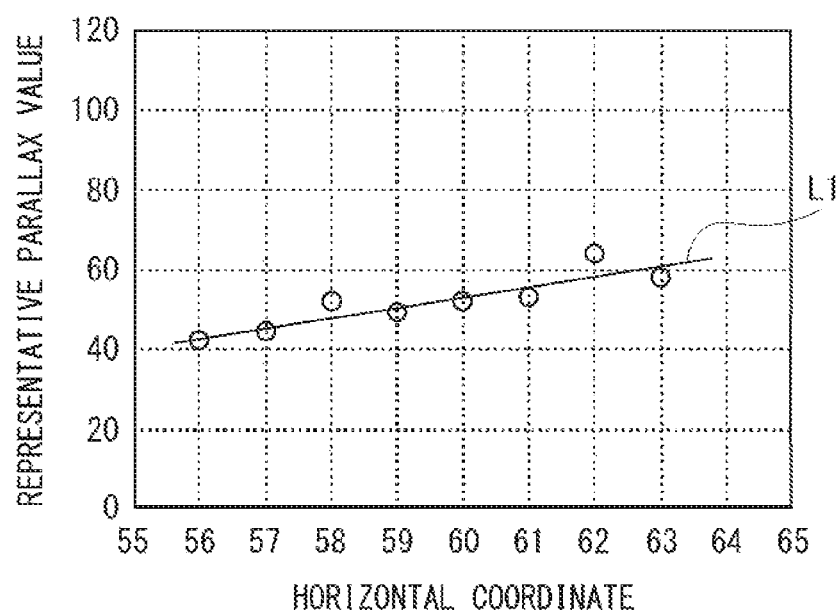
FIG. 9 is another explanatory diagram illustrating the operation example of the approximate line calculator illustrated in FIG. 1.

FIG. 9 illustrates an example of the approximate line L (approximate line L1) of the representative parallax values in the image region R1. In this example, the approximate line calculator 32 may calculate the approximate line L1 with the use of a method of least squares, on the basis of the representative parallax values in the image region R1. Although the approximate line calculator 32 may use the method of least squares in this example, without being limited thereto, another calculation method usable for the calculation of the approximate line L1 may be used.

In this way, the approximate line calculator 32 may calculate the approximate line L1 of the representative parallax values in the image region R1. Similarly, the approximate line calculator 32 may calculate the approximate line L (approximate line L2) of the representative parallax values in the image region R2, and calculate the approximate line L (approximate line L3) of the representative parallax values in the image region R3.

Thereafter, the estimator 33 may estimate the continuous structure degree D of the three-dimensional object, on the basis of the slope value A of the approximate line L in each of the image regions R1 to R3 (step S104). The process in step S104 is described in detail below.

Figure 10:
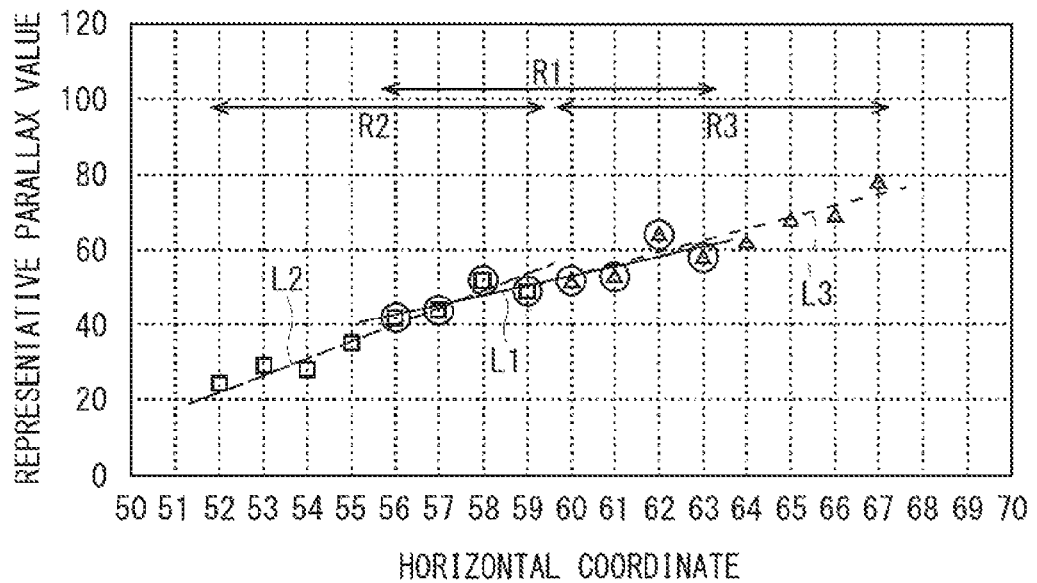
FIG. 10 is an explanatory diagram illustrating an example of approximate lines in a case where a three-dimensional object is a continuous structure.
Figure 11:
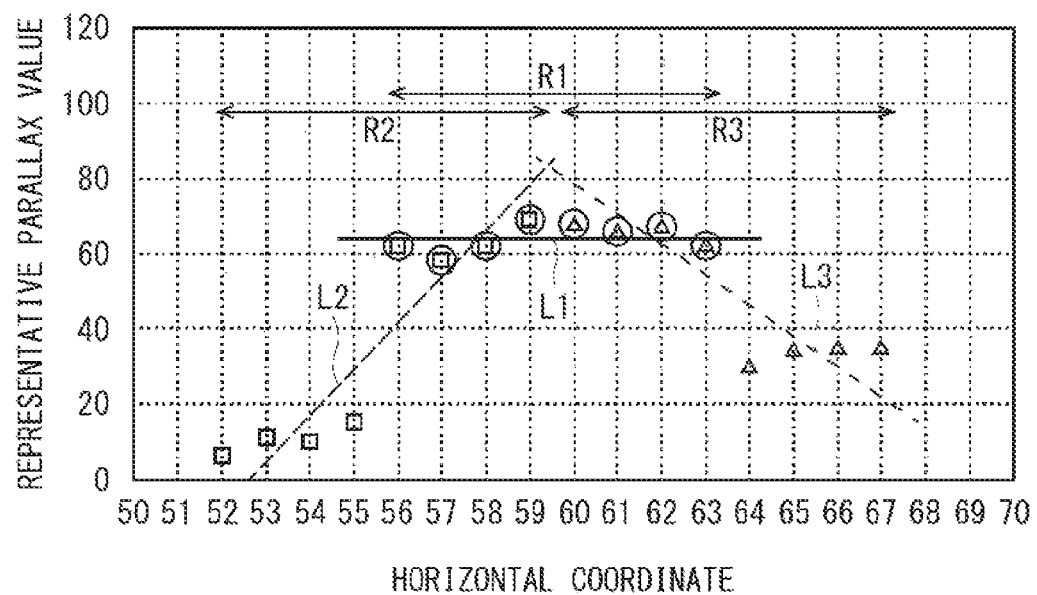
FIG. 11 is an explanatory diagram illustrating an example of approximate lines in a case where the three-dimensional object is a vehicle.

FIG. 10 illustrates an example of the approximate lines L in the image regions R1 to R3 in a case where the three-dimensional object is a continuous structure. FIG. 11 illustrates an example of the approximate lines L in the image regions R1 to R3 in a case where the three-dimensional object is a vehicle.

In a case where the three-dimensional object is a continuous structure, as illustrated in FIG. 10, the representative parallax values substantially line up in a straight line in the image regions R1 to R3. In other words, the representative parallax values of the image regions R1 to R3 correspond to distances to the continuous structure, and accordingly the representative parallax values substantially line up in a straight line. Therefore, the slope value A (slope value A1) of the approximate line L1 of the image region R1, the slope value A (slope value A2) of the approximate line L2 of the image region R2, and the slope value A (slope value A3) of the approximate line L3 of the image region R3 are expected to be substantially the same.

In contrast, in a case where the three-dimensional object is a vehicle, as illustrated in FIG. 11, a large difference may occur between a representative parallax value in the image region R1 and a representative parallax value outside the image region R1. In other words, the representative parallax value in the image region R1 corresponds to a distance to the vehicle in the image region R1. The representative parallax value outside the image region R1 corresponds to a distance to the background farther than the vehicle, and accordingly is a value smaller than the representative parallax value in the image region R1. In this way, a large difference may occur between the representative parallax value in the image region R1 and the representative parallax value outside the image region R1. Therefore, the representative parallax value may greatly change at the left end and the right end of the image region R1. In this case, the slope value A2 of the approximate line L2 of the image region R2 is expected to be different from the slope value A1 of the approximate line L1 of the image region R1. Similarly, the slope value A3 of the approximate line L3 of the image region R3 is expected to be different from the slope value A1 of the approximate line L1 of the image region R1.

The estimator 33 may use such characteristics of the slope value A of the approximate line L of the image regions R1 to R3, to estimate the continuous structure degree D of the three-dimensional object.

First, with the use of the following equations, the estimator 33 may calculate a slope value ratio VALA indicating a ratio between the slope value A1 and the slope value A2, and calculate a slope value ratio VALB indicating a ratio between the slope value A1 and the slope value A3.

$$\text{VALA} = \text{Abs}(\text{Abs}(A2/A1) - 1) \qquad \text{(EQ1)}$$

$$\text{VALB} = \text{Abs}(\text{Abs}(A3/A1) - 1) \qquad \text{(EQ2)}$$

In the equations, Abs may be a function that returns the absolute value of an argument. The slope value ratio VALA may exhibit a larger value as the slope values A1 and A2 differ from each other more greatly, and the slope value ratio VALB may exhibit a larger value as the slope values A1 and A3 differ from each other more greatly.

Figure 12:
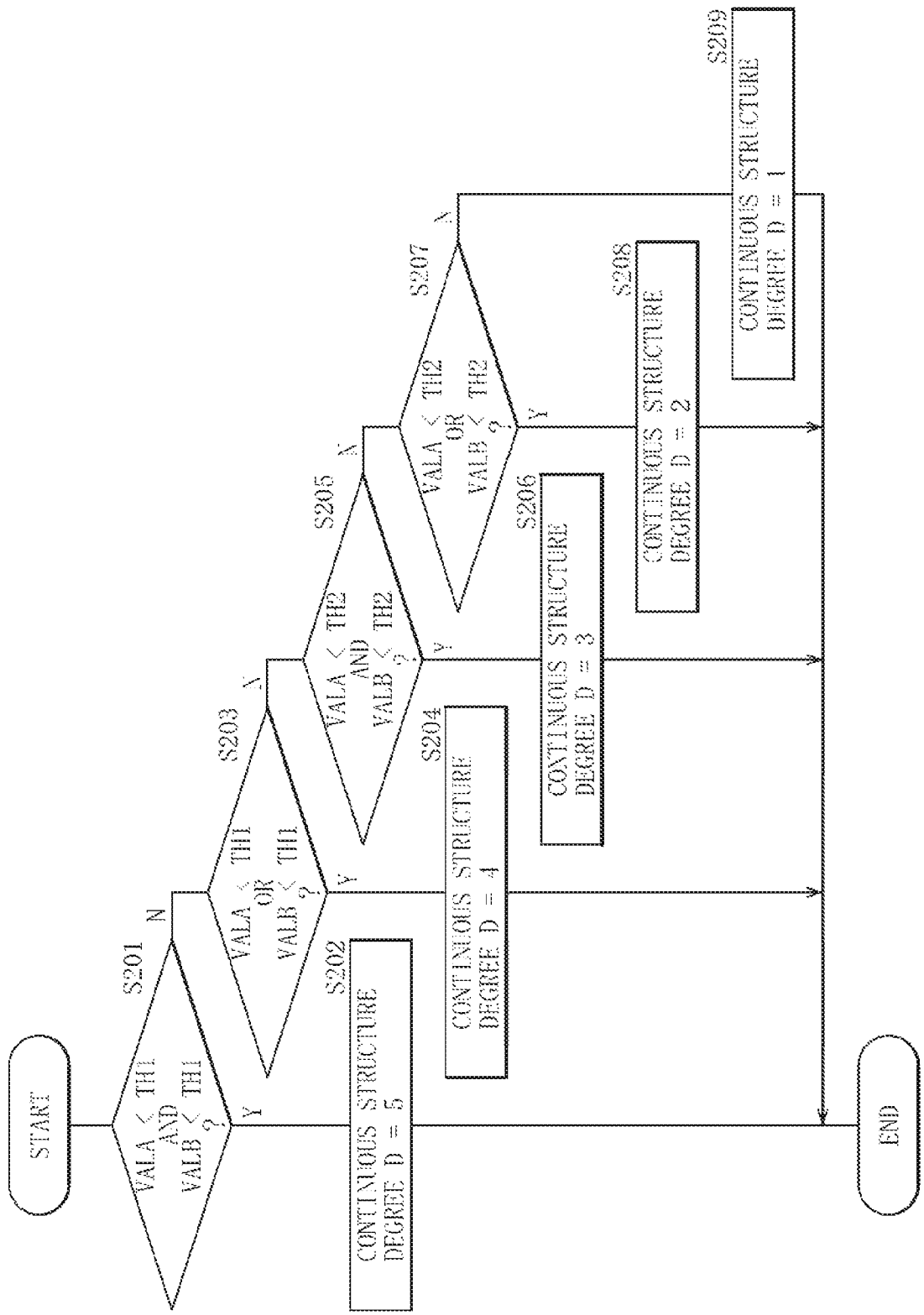
FIG. 12 is a flowchart illustrating an operation example of an estimator illustrated in FIG. 1.

FIG. 12 illustrates an example of such a process of estimating the continuous structure degree D of the three-dimensional object on the basis of the slope value ratios VALA and VALB. The estimator 33 may estimate the continuous structure degree D of the three-dimensional object, by comparing the slope value ratios VALA and VALB with predetermined thresholds TH1 and TH2. The threshold TH1 may be a value lower than the threshold TH2. In this example, the continuous structure degree D may take a value of "1" to "5".

First, the estimator 33 may check whether a condition that the slope value ratio VALA is smaller than the threshold TH1 and the slope value ratio VALB is smaller than the threshold TH1 is satisfied (step S201). If this condition is satisfied ("Y" in step S201), the estimator 33 may set the continuous structure degree D to "5" (step S202). In other words, the slope value ratio VALA being smaller than the threshold TH1 indicates that the slope values A1 and A2 are substantially the same as each other, and the slope value ratio VALB being smaller than the threshold TH1 indicates that the slope values A1 and A3 are substantially the same as each other. Therefore, in this case, the slope values A1 to A3 are substantially the same as each other as illustrated in FIG. 10, for example. The estimator 33 may accordingly estimate that the three-dimensional object is likely to be a continuous structure, and set the continuous structure degree D to "5". This process may thus end.

If the condition in step S201 is not satisfied ("N" in step S201), the estimator 33 may check whether a condition that either one of the slope value ratios VALA and VALB is smaller than the threshold TH1 is satisfied (step S203). If this condition is satisfied ("Y" in step S203), the estimator 33 may set the continuous structure degree D to "4" (step S204). In other words, in this case, either one of the slope values A2 and A3 is substantially the same as the slope value A1. The estimator 33 may accordingly estimate that the three-dimensional object is rather likely to be a continuous structure, and set the continuous structure degree D to "4". This process may thus end.

If the condition in step S203 is not satisfied ("N" in step S203), the estimator 33 may check whether a condition that the slope value ratio VALA is smaller than the threshold TH2 and the slope value ratio VALB is smaller than the threshold TH2 is satisfied (step S205). If this condition is satisfied ("Y" in step S205), the estimator 33 may set the continuous structure degree D to "3" (step S206). In other words, in this case, the slope value A2 is a value that is not substantially the same as but close to the slope value A1, and the slope value A3 is a value that is not substantially the same as but close to the slope value A1. The estimator 33 may accordingly set the continuous structure degree D to "3". This process may thus end.

If the condition in step S205 is not satisfied ("N" in step S205), the estimator 33 may check whether a condition that either one of the slope value ratios VALA and VALB is smaller than the threshold TH2 is satisfied (step S207). If this condition is satisfied ("Y" in step S207), the estimator 33 may set the continuous structure degree D to "2" (step S208). In other words, in this case, either one of the slope values A2 and A3 is a value close to the slope value A1, whereas the other is a value far from the slope value A1. The estimator 33 may accordingly estimate that the three-dimensional object is rather unlikely to be a continuous structure, and set the continuous structure degree D to "2". This process may thus end.

If the condition in step S207 is not satisfied ("N" in step S207), the estimator 33 may set the continuous structure degree D to "1" (step S209). In other words, in this case, both of the slope values A2 and A3 are values far from the slope value A1. The estimator 33 may accordingly estimate that the three-dimensional object is unlikely to be a continuous structure, and set the continuous structure degree D to "1". This process may thus end.

In this way, the process in step S104 illustrated in FIG. 6 may end.

As described above, in the image processing device 1, the image region R1 may be set at a position corresponding to a detected three-dimensional object, the image region R2 may be set at a position shifted to the left from the image region R1, and the image region R3 may be set at a position shifted to the right from the image region R2. In each of the image regions R1 to R3, the approximate line L of the representative parallax values may be calculated. The continuous structure degree D indicating the degree of likeliness of the three-dimensional object being a continuous structure may be estimated on the basis of the slope value A1 of the approximate line L1 of the image region R1, the slope value A2 of the approximate line L2 of the image region R2, and the slope value A3 of the approximate line L3 of the image region R3. Thus, the image processing device 1 makes it possible to, in a case where the continuous structure degree D of the three-dimensional object is high, make the relevant three-dimensional object less likely to be determined as being a vehicle. This helps to enhance the accuracy in determining whether a three-dimensional object is a vehicle.

In the image processing device 1, as illustrated in FIG. 7, the image region R2 may be set to include the left end of the image region R1 and partly overlap the image region R1, and the image region R3 may be set to include the right end of the image region R1 and partly overlap the image region R1. Thus, the image processing device 1 makes it possible to, in a case where the three-dimensional object is not a continuous structure, for example, make the slope value A2 of the approximate line L2 different from the slope value A1 of the approximate line L1, and make the slope value A3 of the approximate line L3 different from the slope value A1 of the approximate line L1, as illustrated in FIG. 11. In other words, in a case where the image region R2 is set next to the image region R1 on the left without overlapping the image region R1, for example, the approximate line L2 of the image region R2 is not influenced by the representative parallax values in the image region R1. The slope value A2 of the approximate line L2 can accordingly be a value close to the slope value A1 of the approximate line L1. The same may apply to the image region R3; the slope value A3 of the approximate line L3 can be a value close to the slope value A1 of the approximate line L1. In this case, it is difficult to estimate the continuous structure degree D of the three-dimensional object on the basis of the slope values A1 to A3. In contrast, in the image processing device 1, part of the image region R2 may overlap part of the image region R1. Therefore, the slope value A2 of the approximate line L2 is influenced by the representative parallax values in the image region R1, as illustrated in FIG. 11. It is thus possible to make the slope value A2 of the approximate line L2 different from the slope value A1 of the approximate line L1. The same may apply to the image region R3; it is possible to make the slope value A3 of the approximate line L3 different from the slope value A1 of the approximate line L1. This makes it possible to, in the image processing device 1, estimate the continuous structure degree D of the three-dimensional object on the basis of the slope values A1 to A3. Consequently, the image processing device 1 makes it possible to enhance the accuracy in determining whether a three-dimensional object is a vehicle.

For example, in the image processing device 1, the left end of the image region R1 may be positioned near the middle of the image region R2, and the right end of the image region R1 may be positioned near the middle of the image region R3. Thus, the image processing device 1 makes it possible to make the representative parallax values in the image region R1 and the representative parallax values in the image region R2, to be used in calculating the approximate line L2, substantially the same in number as illustrated in FIGS. 11 and 12. This makes it possible to, in calculating the approximate line L2, make a weight of the representative parallax values in the image region R1 substantially the same as a weight of the representative parallax values in the image region R2. Consequently, in a case where the three-dimensional object is not a continuous structure, for example, it is possible to make the slope value A2 of the approximate line L2 different from the slope value A1 of the approximate line L1, as illustrated in FIG. 11. The same may apply to the approximate line L3; it is possible to make the slope value A3 of the approximate line L3 different from the slope value A1 of the approximate line L1. Thus, the image processing device 1 makes it possible to estimate the continuous structure degree D of the three-dimensional object on the basis of the slope values A1 to A3. This helps to enhance the accuracy in determining whether a three-dimensional object is a vehicle.

As described above, in the example embodiment, the image region R1 may be set at a position corresponding to the detected three-dimensional object, the image region R2 may be set at a position shifted to the left from the image region R1, and the image region R3 may be set at a position shifted to the right from the image region R2. In each of the image regions R1 to R3, the approximate line of the representative parallax values may be calculated. The continuous structure degree indicating the degree of likeliness of the three-dimensional object being a continuous structure may be estimated on the basis of the slope value of the approximate line of the image region R1, the slope value of the approximate line of the image region R2, and the slope value of the approximate line of the image region R3. This makes it possible to enhance the accuracy in determining whether a three-dimensional object is a vehicle.

In the example embodiment, the image region R2 may be set to include the left end of the image region R1 and partly overlap the image region R1, and the image region R3 may be set to include the right end of the image region R1 and partly overlap the image region R1, which makes it possible to enhance the accuracy in determining whether a three-dimensional object is a vehicle.

In the above example embodiment, the distance image PZ is assumed to be an image constituted by parallax values. Without being limited thereto, the distance image PZ may be an image constituted by distance values. In one embodiment, the distance values in the distance image PZ may serve as "parallax-related values".

In the above example embodiment, the image regions R2 and R3 may each be set at a position shifted from the position of the image region R1 by half of the width of the image region R1, but this is a non-limiting example. For example, the image regions R2 and R3 may each be set at a position shifted from the position of the image region R1 by an amount less than half of the width of the image region R1. In another example, the image regions R2 and R3 may each be set at a position shifted from the position of the image region R1 by an amount more than half of the width of the image region R1. An amount of shift between each of the positions of the image regions R2 and R3 and the position of the image region R1 may not be a fixed amount. In one example, the amount of shift may be changed on the basis of, for example, a width of the three-dimensional object region Robj or a distance to the three-dimensional object.

In the above example embodiment, the sizes of the image regions R2 and R3 may be the same as the size of the image region R1. Without being limited thereto, for example, the size of the image region R2 may be made different from the size of the image region R1, or the size of the image region R3 may be made different from the size of the image region R1.

In the above example embodiment, the continuous structure degree D may be estimated on the basis of the slope value A of each of the approximate line L1 to L3. The continuous structure degree D may not be estimated, for example, in a case where representative parallax values are dispersed greatly. Described below are details of an image processing device 1B according to Modification Example 4.

The image processing device 1B may include a processor 20B, as with the image processing device 1 according to the above example embodiment (FIG. 1). The processor 20B may include a continuous structure estimator 30B. The continuous structure estimator 30B may include an estimator 33B.

The estimator 33B may be configured to estimate, on the basis of the slope value A of the approximate line L in each of the three image regions R, the continuous structure degree D of the three-dimensional object detected by the three-dimensional object detector 22. The estimator 33B may refrain from estimating the continuous structure degree D of the three-dimensional object, in a case where representative parallax values are dispersed greatly from the approximate line L in each of the three image regions R.

Figure 13:
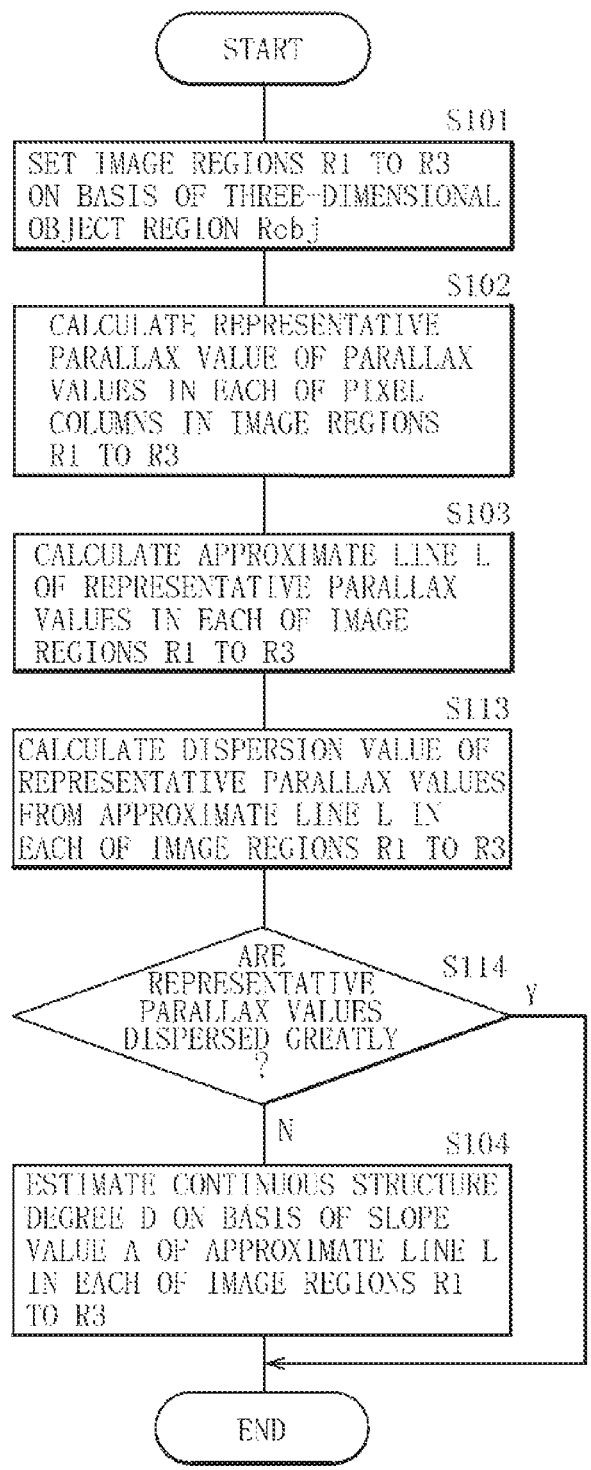
FIG. 13 is a flowchart illustrating an operation example of a continuous structure estimator according to a modification example.

FIG. 13 illustrates an operation example of the continuous structure estimator 30B.

As with the case of the above example embodiment illustrated in FIG. 6, first, the image region setting unit 31 may set the image regions R1 to R3 in the distance image PZ, on the basis of the three-dimensional object region Robj set by the three-dimensional object detector 22 (step S101). Thereafter, the approximate line calculator 32 may calculate the representative value of the parallax values (the representative parallax value), in each of the pixel columns in the three image regions R1 to R3 set by the image region setting unit 31 (step S102), and calculate the approximate line L of the representative parallax values in each of the image regions R1 to R3 (step S103).

Thereafter, the estimator 33B may calculate, in each of the image regions R1 to R3, a dispersion value of the representative parallax values from the approximate line L (step S113). The dispersion value may be a variance, or may be a standard deviation.

Thereafter, the estimator 33B may check whether the representative parallax values are dispersed greatly, on the basis of the dispersion values in the respective image regions R1 to R3 calculated in step S113 (step S114). In one example, the estimator 33B may determine that the representative parallax values are dispersed greatly in a case where all of the dispersion values in the respective image regions R1 to R3 are larger than a predetermined threshold. Without being limited thereto, the estimator 33B may determine that the representative parallax values are dispersed greatly, for example, in a case where at least one of the dispersion values in the respective image regions R1 to R3 is larger than a predetermined threshold. If the representative parallax values are dispersed greatly ("Y" in step S114), this process illustrated in FIG. 13 may end.

If the representative parallax values are not dispersed greatly in step S114 ("N" in step S114), the estimator 33B may, as with the case of the above example embodiment illustrated in FIG. 6, estimate the continuous structure degree D of the three-dimensional object, on the basis of the slope value A of the approximate line L in each of the image regions R1 to R3 (step S104). This process may thus end.

As described above, in the image processing device 1B, the continuous structure degree D of a three-dimensional object may not be estimated in a case where representative parallax values are dispersed greatly from the approximate line L. This enables the vehicle determining unit 25 to adjust a degree of likeliness of the relevant three-dimensional object being determined as being a vehicle.

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the above example embodiment, the three image regions R1 to R3 may be set on the basis of the three-dimensional object region Robj. Without being limited thereto, four or more image regions R may be set on the basis of the three-dimensional object region Robj. In this case, the continuous structure degree D may be estimated on the basis of the slope value of the approximate line L of each of the four or more image regions R.

For example, in the above example embodiment, the equation EQ1 may be used to calculate the slope value ratio VALA, and the equation EQ2 may be used to calculate the slope value ratio VALB, but this is a non-limiting example. The equation EQ1 for the slope value ratio VALA may be any equation, as long as the equation enables evaluation of whether the slope value A1 of the approximate line L1 and the slope value A2 of the approximate line L2 are values close to each other. The equation EQ2 for the slope value ratio VALB may be any equation, as long as the equation enables evaluation of whether the slope value A1 of the approximate line L1 and the slope value A3 of the approximate line L3 are values close to each other. The equations EQ1 and EQ2 may be changed as appropriate, for example, in accordance with the conditions in steps S201, S203, S205, and S207 illustrated in FIG. 12.

It is to be noted that the effects described in the specification are by no means limitative but explanatory or exemplary. The technology according to the disclosure may produce other effects, together with the forgoing effects, or instead of the forgoing effects.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. An image processing device comprising
one or more processors communicably connected to a stereo camera, the one or more processors being configured to:
receive a stereo image from the stereo camera;
set a three-dimensional object region by detecting a three-dimensional object, on a basis of a distance image that is to be generated on a basis of the stereo image and includes parallax-related values corresponding to parallaxes in respective pixels;
set, into the distance image, a first image region that is same as the three-dimensional object region in size and position, a second image region including a left end of the first image region and partly overlapping the first image region, and a third image region including a right end of the first image region and partly overlapping the first image region;
calculate, in each of the first image region, the second image region, and the third image region, representative values of the parallax-related values including (i) a first representative value based on first parallax-related values corresponding to a first pixel column that includes pixels having a first horizontal coordinate in the distance image, and (ii) a second representative value based on second parallax-related values corresponding to a second pixel column that includes pixels having a second horizontal coordinate different from the first horizontal coordinate in the distance image,
calculate a first approximate line in the first image region based on the representative values in the first image region, a second approximate line in the second image region based on the representative values in the second image region, and a third approximate line in the third image region based on the representative values in the third image region;
estimate a continuous structure degree indicating a degree of likeliness of the three-dimensional object being a continuous structure, on a basis of a first slope value of the first approximate line of the first image region, a second slope value of the second approximate line of the second image region, and a third slope value of the third approximate line of the third image region; and
determine whether the three-dimensional object detected by the detector is a vehicle, on a basis of the continuous structure degree.

2. The image processing device according to claim 1, wherein the processor is configured to
estimate that the continuous structure degree is high in a case where the second slope value and the third slope value are close to the first slope value, and
estimate that the continuous structure degree is low in a case where the second slope value and the third slope value are far from the first slope value.

3. The image processing device according to claim 2, wherein the processor is configured to
determine whether the continuous structure degree is to be estimated, on a basis of dispersion of the representative values in the first image region from the first approximate line in the first image region, dispersion of the representative values in the second image region from the second approximate line in the second image region, and dispersion of the representative values in the third image region from the third approximate line in the third image region, and
upon determining that the continuous structure degree is to be estimated, estimate the continuous structure degree.

4. The image processing device according to claim 2, wherein
the left end of the first image region is positioned near a middle of the second image region, and
the right end of the first image region is positioned near a middle of the third image region.

5. The image processing device according to claim 2, wherein the first image region, the second image region, and the third image region have widths equal to each other.

6. The image processing device according to claim 2, wherein the first representative value is a most frequent value of the first parallax-related values, the second representative value is a most frequent value of the second parallax-related values, and the third representative value is a most frequent value of the third parallax-related values.

7. The image processing device according to claim 2, wherein the first representative value is an average of the first parallax-related values, the second representative value is an average of the second parallax-related values, and the third representative value is an average of the third parallax-related values.

8. The image processing device according to claim 1, wherein the processor is configured to
determine whether the continuous structure degree is to be estimated, on a basis of dispersion of the representative values in the first image region from the first approximate line in the first image region, dispersion of the representative values in the second image region from the second approximate line in the second image region, and dispersion of the representative values in the third image region from the third approximate line in the third image region, and upon determining that the continuous structure degree is to be estimated, estimate the continuous structure degree.

9. The image processing device according to claim 1, wherein
the left end of the first image region is positioned near a middle of the second image region, and
the right end of the first image region is positioned near a middle of the third image region.

10. The image processing device according to claim 1, wherein the first image region, the second image region, and the third image region have widths equal to each other.

11. The image processing device according to claim 1, wherein the first representative value is a most frequent value of the first parallax-related values, the second representative value is a most frequent value of the second parallax-related values, and the third representative value is a most frequent value of the third parallax-related values.

12. The image processing device according to claim 1, wherein the first representative value is an average of the first parallax-related values, the second representative value is an average of the second parallax-related values, and the third representative value is an average of the third parallax-related values.

13. The image processing device according to claim 1, wherein
the representative values of the parallax-related values further includes (iii) a third representative value based on third parallax-related values corresponding to a third pixel column that includes pixels having a third horizontal coordinate different from the first horizontal coordinate and the second horizontal coordinate in the distance image,
the first pixel column is at a left end of each of the first image region, the second image region and the third image region,
the second pixel column the first pixel column is at a right end of each of the first image region, the second image region and the third image region,
the third pixel column is in a middle portion between the left end and the right end of each of the first image region, the second image region and the third image region, and
the left end of the first image region is in the middle portion of the second image region, and the right end of the first image region is in the middle portion of the third image region.

14. The image processing device according to claim 13, wherein a size of the second image region and a size of third image region is identical to a size of the first image region.

15. The image processing device according to claim 14, wherein
the first representative value is a most frequent value of the first parallax-related values, the second representative value is a most frequent value of the second parallax-related values, and the third representative value is a most frequent value of the third parallax-related values, or
the first representative value is an average of the first parallax-related values, the second representative value is an average of the second parallax-related values, and the third representative value is an average of the third parallax-related values.

16. The image processing device according to claim 1, wherein the processor is configured to
set the second image region at a position that is shifted to a left from a position of the first image region by half of a width of the first image region in horizontal coordinates of the distance image, and that is same as a position of the first image region in vertical coordinates of the distance image, and
set the third image region at a position shifted to a right from a position of the first image region by half of the width of the first image region in horizontal coordinates of the distance image, and that is same as a position of the first image region in vertical coordinates of the distance image.

17. The image processing device according to claim 1, wherein the processor is configured to calculate the representative values of the parallax-related values for every horizontal coordinate over an entirety of horizontal coordinates of regions including the first image region, the second image region and the third image region.

18. An image processing method comprising:
setting a three-dimensional object region by detecting a three-dimensional object, on a basis of a distance image that is to be generated on a basis of a stereo image and includes parallax-related values corresponding to parallaxes in respective pixels;
setting, into the distance image, a first image region that is same as the three-dimensional object region in size and position, a second image region including a left end of the first image region and partly overlapping the first image region, and a third image region including a right end of the first image region and partly overlapping the first image region;
calculating, in each of the first image region, the second image region, and the third image region, representative values of the parallax-related values including (i) a first representative value based on first parallax-related values corresponding to a first pixel column that includes pixels having a first horizontal coordinate in the distance image, and (ii) a second representative value based on second parallax-related values corresponding to a second pixel column that includes pixels having a second horizontal coordinate different from the first horizontal coordinate in the distance image;
calculating a first approximate line in the first image region based on the representative values in the first image region, a second approximate line in the second image region based on the representative values in the second image region, and a third approximate line in the third image region based on the representative values in the third image region;
estimating a continuous structure degree indicating a degree of likeliness of the three-dimensional object being a continuous structure, on a basis of a first slope value of the first approximate line of the first image region, a second slope value of the second approximate line of the second image region, and a third slope value of the third approximate line of the third image region; and
determining whether the three-dimensional object detected is a vehicle, on a basis of the continuous structure degree.

19. An image processing device comprising
circuitry configured to
set a three-dimensional object region by detecting a three-dimensional object, on a basis of a distance image that is to be generated on a basis of a stereo image and includes parallax-related values corresponding to parallaxes in respective pixels, set, into the distance image, a first image region that is same as the three-dimensional object region in size and position, a second image region including a left end of the first image region and partly overlapping the first image region, and a third image region including a right end of the first image region and partly overlapping the first image region, calculate, in each of the first image region, the second image region, and the third image region, representative values of the parallax-related values including (i) a first representative value based on first parallax-related values corresponding to a first pixel column that includes pixels having a first horizontal coordinate in the distance image, and (ii) a second representative value based on second parallax-related values corresponding to a second pixel column that includes pixels having a second horizontal coordinate different from the first horizontal coordinate in the distance image, calculate a first approximate line in the first image region based on the representative values in the first image region, a second approximate line in the second image region based on the representative values in the second image region, and a third approximate line in the third image region based on the representative values in the third image region, estimate a continuous structure degree indicating a degree of likeliness of the three-dimensional object being a continuous structure, on a basis of a first slope value of the first approximate line of the first image region, a second slope value of the second approximate line of the second image region, and a third slope value of the third approximate line of the third image region, and determine whether the three-dimensional object detected by the detector is a vehicle, on a basis of the continuous structure degree.

* * * * *